United States Patent
Venter

(10) Patent No.: US 7,833,126 B2
(45) Date of Patent: Nov. 16, 2010

(54) ARRANGEMENT FOR POWER TAKE-OFF ON A TWO-SHAFT ENGINE

(75) Inventor: Gideon Venter, Berlin (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 752 days.

(21) Appl. No.: 11/892,325

(22) Filed: Aug. 22, 2007

(65) Prior Publication Data
US 2008/0047376 A1    Feb. 28, 2008

(30) Foreign Application Priority Data
Aug. 24, 2006 (DE) .................. 10 2006 039 608

(51) Int. Cl.
  *B60W 10/02* (2006.01)
  *B60W 10/04* (2006.01)
  *F16H 37/06* (2006.01)
  *F02C 1/06* (2006.01)
(52) U.S. Cl. .................. 477/39; 477/41; 477/90; 74/665 B; 60/39.162; 60/39.163
(58) Field of Classification Search .................. 477/39, 477/41, 44, 90; 74/661, 665 A, 665 B, 665 E; 60/226.1, 39.162, 39.163
See application file for complete search history.

(56) References Cited

U.S. PATENT DOCUMENTS

| | | | |
|---|---|---|---|
| 3,514,945 A | | 6/1970 | Austin |
| 4,064,690 A | * | 12/1977 | Kronogard .................. 60/792 |
| 4,118,927 A | * | 10/1978 | Kronogard .................. 60/792 |
| 4,326,375 A | * | 4/1982 | Kronogard ................ 60/39.163 |
| 4,776,163 A | | 10/1988 | Brockmann |
| 6,855,084 B2 | * | 2/2005 | Sato et al. .................... 475/209 |
| 2002/0189231 A1 | | 12/2002 | Franchet |
| 2006/0034693 A1 | | 2/2006 | Lardellier |

FOREIGN PATENT DOCUMENTS

| | | |
|---|---|---|
| DE | 3602543 | 10/1987 |
| EP | 1270903 | 1/2003 |
| EP | 1541834 | 6/2005 |

OTHER PUBLICATIONS

European Search Report dated Feb. 5, 2010 from counterpart European patent application.

* cited by examiner

*Primary Examiner*—Roger Pang
(74) *Attorney, Agent, or Firm*—Timothy J. Klima; Shuttleworth & Ingersoll, PLC

(57) ABSTRACT

With a two-shaft engine, the accessory drive gearbox (5) for the operation of a generator and other auxiliaries (6) is connected to the high-pressure shaft (1) via a high-pressure shaft gearbox (3), which is coupled to a low-pressure shaft gearbox (8) connecting to the low-pressure shaft (7), via an overrunning clutch (11), a conical-pulley variable transmission (10) settable on the basis of the shaft speed on both sides, and a first switchable clutch (9). Under certain operating conditions with low speed of the high-pressure shaft or in case of engine failure, the power of the low-pressure shaft, with the clutch (9) engaged, is transferred to the high-pressure shaft gearbox and hence to the accessory drive gearbox via the conical-pulley variable transmission, which compensates for shaft speed difference, and the overrunning clutch, in order to reliably further operate the generator and other accessories with low fuel consumption or by windmilling only.

13 Claims, 1 Drawing Sheet

ARRANGEMENT FOR POWER TAKE-OFF ON A TWO-SHAFT ENGINE

SPECIFICATION

Figure 1:
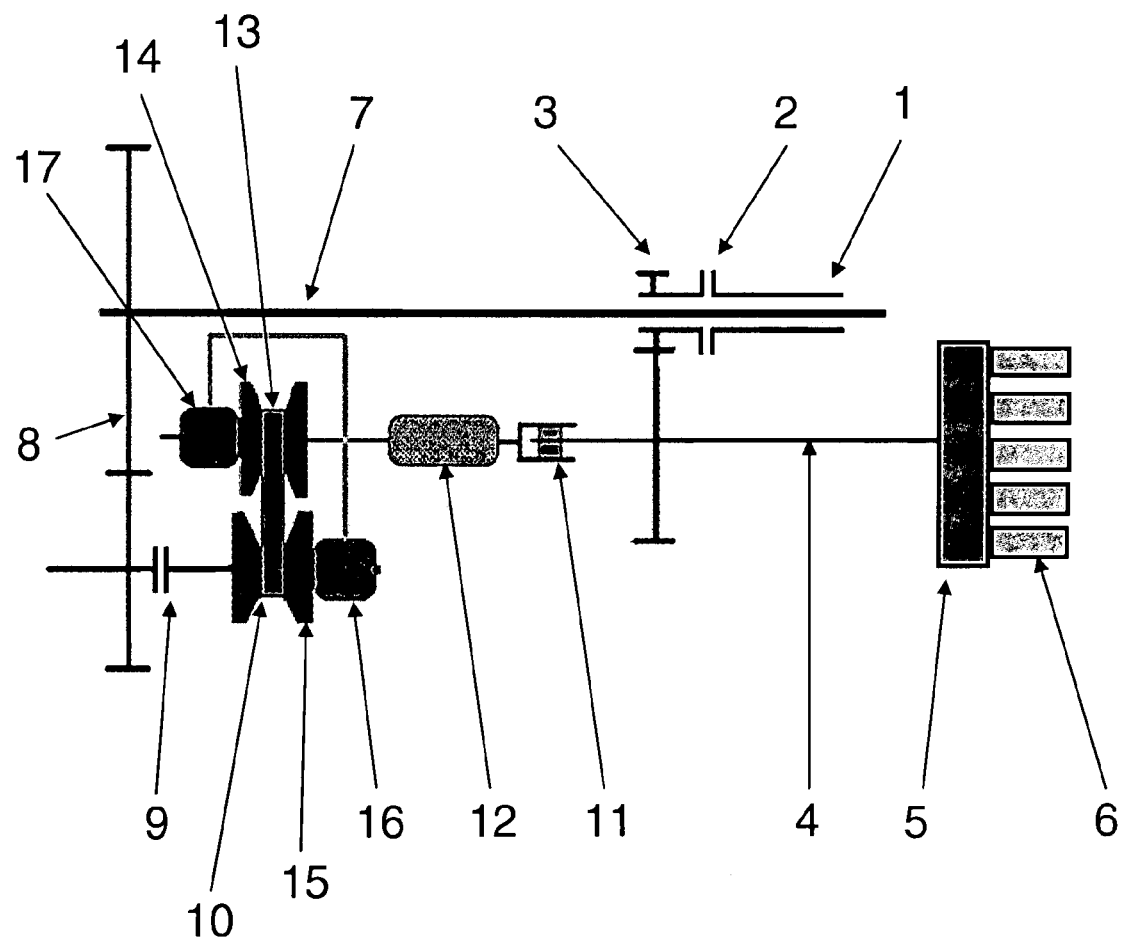

This application claims priority to German Patent Application DE 10 2006 039 608.1 filed Aug. 24, 2006, the entirety of which is incorporated by reference herein.

This invention relates to an arrangement for power take-off on a two-shaft engine which features a low-pressure shaft and a high-pressure shaft connected to a generator via an accessory drive gearbox.

Aircraft equipped with two-shaft engines are, as is generally known, supplied with electric power from a generator connected to the high-pressure shaft of the engine via a gearbox, with this generator being also used as starter for the engine. Other devices, such as fuel and oil pumps and similar equipment, are mounted on this accessory drive gearbox. While this principle has proved to be satisfactory up to a certain amount of power take-off, it fails to meet the permanently rising power demand of aircraft whose systems are increasingly converted to electrical operation, i.e. the electric power demand can, on the one hand, not be satisfied when the speed of the high-pressure shaft is reduced in certain operating phases, for example in the landing phase or at standstill, and, on the other hand, fuel consumption is considerably increased if the high-pressure shaft is run up in these phases—which normally is not required. Using the low-pressure shaft, which has high capacity reserves even at idle, for power generation is problematic in that the low-pressure shaft runs at significantly lower speed than the high-pressure shaft and, in addition, operates over a wide speed range so that multiple, switchable gearboxes would have to be provided for power transmission to a generator which, however, are expensive in terms of design and circuitry, increase engine weight, and, due to the multiple circuitry, compromise reliability. The use of the low-pressure shaft for power generation by use of a generator connected to it is further impeded by the fact that this generator could then not be used for engine start.

The present invention, in a broad aspect, provides for a two-shaft engine such that, with low fuel consumption, high power take-off from the generator as well as operation of pumps and hydraulic systems is ensured even under certain operating conditions where the high-pressure shaft operates in a low speed range.

It is a particular object of the present invention to provide at least one solution to the above problems by an arrangement for power take-off designed in accordance with the features described herein. Useful developments of the invention will also become apparent from the present description.

The essential idea of the present invention is that additional use is made of the power of the low-pressure shaft when the high-pressure shaft rotates too slow under certain operating conditions or does not rotate at all in the event of an engine failure. A speed-increasing gearbox connected to the low-pressure shaft and a gearbox for output speed reduction connected to the high-pressure shaft are connected by a conical-pulley variable transmission and an overrunning clutch, actuatable by a switchable clutch if speed is too low or engine failure has occurred. The overrunning clutch is designed such that it prevents power from being transmitted from the high-pressure system to the low-pressure system. The conical-pulley variable transmission, which is settable on the basis of a torque or speed measurement of the two shafts, provides for speed compensation between both shafts which rotate at different and, in relation to the low-pressure shaft, even at alternating speed, enabling the power of the low-pressure shaft to be transmitted to the gearbox connected to the high-pressure shaft. Employing the power of the low-pressure shaft, sufficient power can thus be transmitted to the accessory drive gearbox connected to the high-pressure shaft gearbox to drive an electric power generator and other accessories, with fuel saving being simultaneously obtained.

If the power of the low-pressure shaft is used in the windmilling case upon engine failure, a further switchable clutch disengages the high-pressure shaft gearbox from the high-pressure shaft, which in this case is not driven. This enables the accessory drive gearbox to be operated at higher speed to ensure generator and pump operation.

The present invention is more fully described in light of the accompanying drawing showing a preferred embodiment.

FIG. 1 schematically shows an arrangement for a two-shaft engine for optionally coupling the low-pressure shaft to an accessory drive gearbox connected to the high-pressure shaft, with the accessory drive gearbox being connected to a generator and other accessories provided for engine operation.

As shown in the drawing, the high-pressure shaft 1 is coupled, via a second switchable clutch 2, a high-pressure shaft gearbox 3 and a radial shaft 4, to an accessory drive gearbox 5 which is connected to various auxiliaries and accessories 6, namely a generator for production and provisioning of electric power for the aircraft as well as hydraulic pumps, oil pumps, fuel pumps and similar equipment. Under normal flying conditions, sufficient electric power for the aircraft will thus be supplied by a generator driven by the high-pressure shaft 1.

Under certain operating conditions, namely when the aircraft is on the ground or in the landing phase and the high-pressure shaft 1 rotates at reduced speed only, the speed of the high-pressure shaft 1 is too low to ensure a sufficient level of power take-off. Increasing the speed of the high-pressure shaft 1 would lead to unnecessarily high fuel consumption. In order to provide for adequate electric power as well as proper operation of the pumps connected to the accessory drive gearbox 5 also in this phase, the sufficiently available power of the low-pressure shaft 7 of the two-shaft engine, while rotating at different speed, is transmitted to the high-pressure shaft gearbox 3 by use of the arrangement described below.

The low-pressure shaft 7 is connected to the high-pressure shaft gearbox 3 via a low-pressure shaft gearbox 8, a first switchable clutch 9, which is in engagement in this phase, a conical-pulley variable transmission 10 (speed compensation gear) and an overrunning clutch 11 to transmit, in a phase of low speed of the high-pressure shaft 1, the power of the low-pressure shaft 7 to the high-pressure shaft 1 and employ it for power take-off at the generator and for operation of other accessories. The low-pressure shaft gearbox 8 provides for speed increase to a value at which maximum power take-off is possible within the operating limits of the conical-pulley variable transmission 10. The difference between the rotational speed of the high-pressure shaft 1 and that of the low pressure shaft 7 is compensated by setting the conical-pulley variable transmission 10 on the basis of a torque sensor 12 arranged subsequently to the conical-pulley variable transmission 10 or a speed input signal from the high-pressure and the low-pressure shaft, respectively.

The conical-pulley variable transmission 10 is an infinitely variable change-speed gear including two conical pulley pairs 14, 15 connected by a flexible wrapping medium 13 (power transmission means), with the distance between the two conical pulleys of each pair being variable. The two conical pulley pairs 14, 15 communicate with the respective actuators 16, 17 operated with a pressure medium or other type of actuator. Depending on the torque determined via the torque sensor 12, the pressure on the wrapping medium 13 is increased or decreased in that the distance between the conical pulleys of the respective conical-pulley pair 14, 15 is varied by the actuators 16, 17, which control and limit power transmission on the basis of the torque signal, thus effecting speed compensation between the high-pressure shaft and the lower-pressure shaft gearbox and providing, via the high-pressure shaft gearbox 3, for an infinitely variable power transmission from the low-pressure shaft 7, which rotates at alternating speed, to the high-pressure shaft 1 or the high-pressure shaft gearbox 3, respectively, employing the power of the low-pressure shaft for power generation if the power that can be extracted from the high-pressure shaft 1 is too low for power take-off.

The high-pressure shaft gearbox 3 serves for adaptation of the output speed of the conical-pulley variable transmission 10 to the speed of the high-pressure shaft 1 and for power transmission to the accessory drive gearbox 5 via the radial shaft 4. The actuators 16, 17 of the conical-pulley variable transmission 10 are controlled by an engine control unit (not shown) which is connected to the torque sensor 12 and regulates the hydraulic pressure to the hydraulically operated actuators 16, 17. The overrunning clutch 11 arranged between the conical-pulley variable transmission 10 and the high-pressure shaft gearbox 3 ensures that energy is transmitted one-way only from the low-pressure shaft to the high-pressure shaft, not vice versa. If the first switchable clutch 9 is not engaged in certain flight phases, the overrunning clutch 11 prevents the conical-pulley variable transmission 10 from being driven, thus reducing wear to the components of the conical-pulley variable transmission.

The above-mentioned second switchable clutch connects the high-pressure shaft 1 to the high-pressure shaft gearbox 3 during engine operation. In the event of an engine failure in flight, this second switchable clutch 2 disengages the high-pressure shaft 1 from the high-pressure shaft gearbox 3, enabling the low-pressure shaft 7 connected to the fan (not shown) to be driven independently of the high-pressure shaft 1, and thus with higher speed, reducing air drag on the aircraft. The power of the low-pressure shaft 7 produced by windmilling upon engine failure is transmitted by the engaged first switchable clutch 9 via the high-pressure shaft gearbox 3, which is disengaged from the high-pressure shaft 1, to the accessory drive gearbox 5, whose speed is controlled by the conical-pulley variable transmission 10, so that electric and hydraulic power can further be generated at the devices 6 connected to the accessory drive gearbox 5.

LIST OF REFERENCE NUMERALS

1 High-pressure shaft
2 Second switchable clutch
3 High-pressure shaft gearbox
4 Radial shaft (drive shaft of accessory drive gearbox)
5 Accessory drive gearbox
6 Auxiliaries/accessories (generator, pumps)
7 Low-pressure shaft
8 Low-pressure shaft gearbox
9 First switchable clutch
10 Conical-pulley variable transmission (speed compensation gear)
11 Overrunning clutch
12 Torque sensor
13 Wrapping medium
14 Conical pulley pair
15 Conical pulley pair
16 Actuator
17 Actuator

What is claimed is:

1. An arrangement for power take-off on a two-shaft engine having a low-pressure shaft and a high-pressure shaft connected to a generator via an accessory drive gearbox, comprising:
   a high-pressure shaft gearbox arranged between the high-pressure shaft and the accessory drive gearbox; and
   a low-pressure shaft gearbox coupled to the low-pressure shaft;
   a first switchable clutch connecting the low-pressure shaft gearbox to the high-pressure shaft gearbox for power transmission from the low-pressure shaft gearbox to the high-pressure shaft gearbox, the clutch being actuatable under certain operating conditions, when a speed of the high-pressure shaft is reduced,
   a conical-pulley variable transmission connecting the low-pressure and high-pressure shaft gearboxes for speed adaptation and setting power transmission between the high-pressure and low-pressure shaft gearboxes; and
   an overrunning clutch connected between the low-pressure and high-pressure shaft gearboxes to allow energy transmission from the low-pressure shaft to the high-pressure shaft and prevent energy transmission from the high-pressure shaft to the low-pressure shaft.

2. An arrangement in accordance with claim 1, wherein the low-pressure shaft gearbox increases an output speed of the low-pressure shaft, with maximum power transfer, to run within a working range of the conical pulley variable transmission, and the high-pressure shaft gearbox reduces an output speed of the low-pressure shaft, to run within a working range of the conical-pulley variable transmission.

3. An arrangement in accordance with claim 2, wherein the conical-pulley variable transmission comprises two conical pulley pairs connected by a wrapping medium, with a distance between the two conical pulleys of at least one pair being adjustable for speed adaptation by at least one actuator, depending on speeds of the high-pressure and the low-pressure shafts, when the first switchable clutch is engaged.

4. An arrangement in accordance with claim 3, and further comprising:
   a torque sensor connected to an electronic engine control and positioned downstream of the conical-pulley variable transmission, for setting the conical-pulley variable transmission on the basis of a measured torque.

5. An arrangement in accordance with claim 3, wherein the setting of the conical-pulley variable transmission is effected on a basis of speed measurements of the high-pressure shaft and the low-pressure shaft.

6. An arrangement in accordance with claim 3, and further comprising a second switchable clutch positioned between the high-pressure shaft and the high-pressure shaft gearbox, which is disengaged in case of engine failure, and which separates the high-pressure shaft from the high-pressure shaft gearbox if the first switchable clutch is engaged.

7. An arrangement in accordance with claim 1, wherein the conical-pulley variable transmission comprises two conical pulley pairs connected by a wrapping medium, with a distance between the two conical pulleys of at least one pair being adjustable for speed adaptation by at least one actuator, depending on speeds of the high-pressure and the low-pressure shafts, when the first switchable clutch is engaged.

8. An arrangement in accordance with claim 7, and further comprising:

a torque sensor connected to an electronic engine control and positioned downstream of the conical-pulley variable transmission, for setting the conical-pulley variable transmission on the basis of a measured torque.

9. An arrangement in accordance with claim 7, wherein the setting of the conical-pulley variable transmission is effected on a basis of speed measurements of the high-pressure shaft and the low-pressure shaft.

10. An arrangement in accordance with claim 7, and further comprising a second switchable clutch positioned between the high-pressure shaft and the high-pressure shaft gearbox, which is disengaged in case of engine failure, and which separates the high-pressure shaft from the high-pressure shaft gearbox if the first switchable clutch is engaged.

11. An arrangement in accordance with claim 1, and further comprising:
a torque sensor connected to an electronic engine control and positioned downstream of the conical-pulley variable transmission, for setting the conical-pulley variable transmission on the basis of a measured torque.

12. An arrangement in accordance with claim 1, wherein the setting of the conical-pulley variable transmission is effected on a basis of speed measurements of the high-pressure shaft and the low-pressure shaft.

13. An arrangement in accordance with claim 1, and further comprising a second switchable clutch positioned between the high-pressure shaft and the high-pressure shaft gearbox, which is disengaged in case of engine failure, and which separates the high-pressure shaft from the high-pressure shaft gearbox if the first switchable clutch is engaged.

* * * * *